No. 715,972. Patented Dec. 16, 1902.
C. H. BUTLER.
TRANSPORTING AND DISTRIBUTING APPARATUS.
(Application filed May 1, 1902.)
(No Model.) 2 Sheets—Sheet 1.
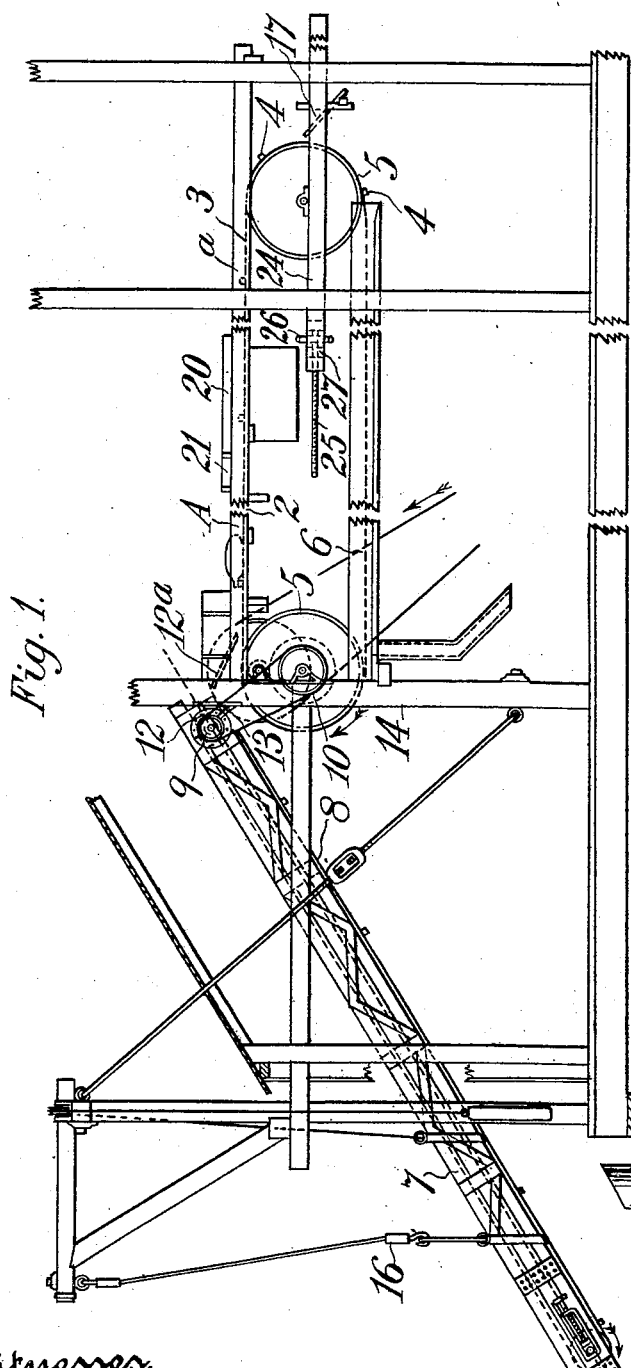
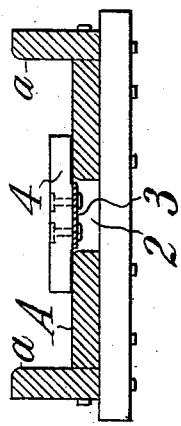
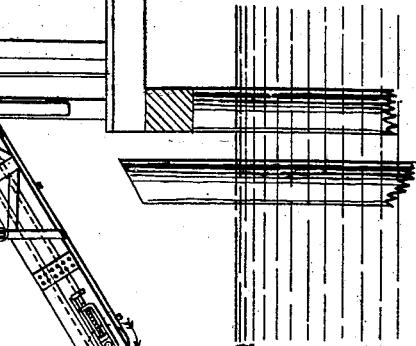
Witnesses: Inventor,
Charles H. Butler
By Dewey Strong & Co.
Attys.
THE NORRIS PETERS CO., PHOTO-LITHO., WASHINGTON, D. C.

No. 715,972. Patented Dec. 16, 1902.
C. H. BUTLER.
TRANSPORTING AND DISTRIBUTING APPARATUS.
(Application filed May 1, 1902.)
(No Model.) 2 Sheets—Sheet 2.
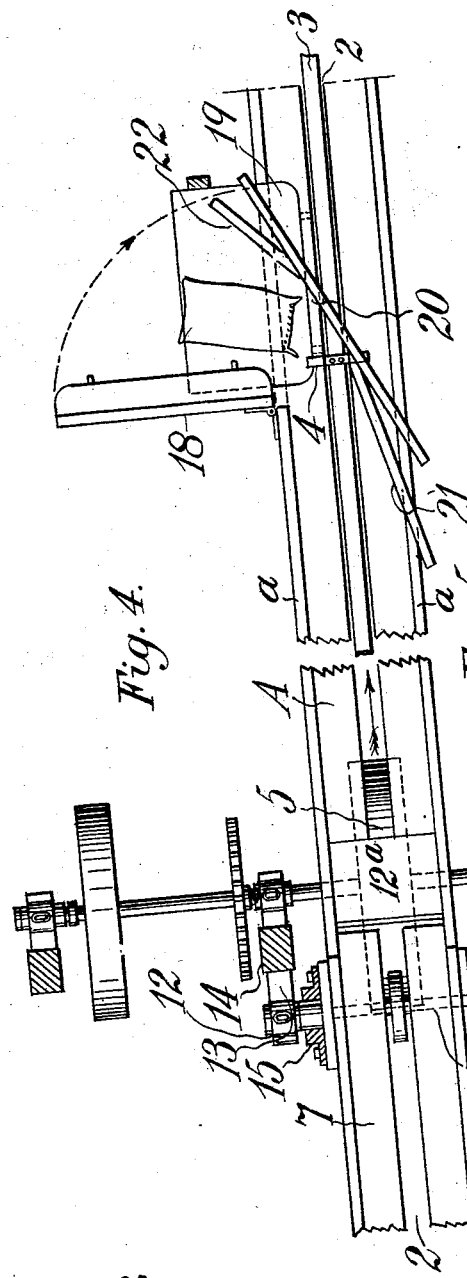
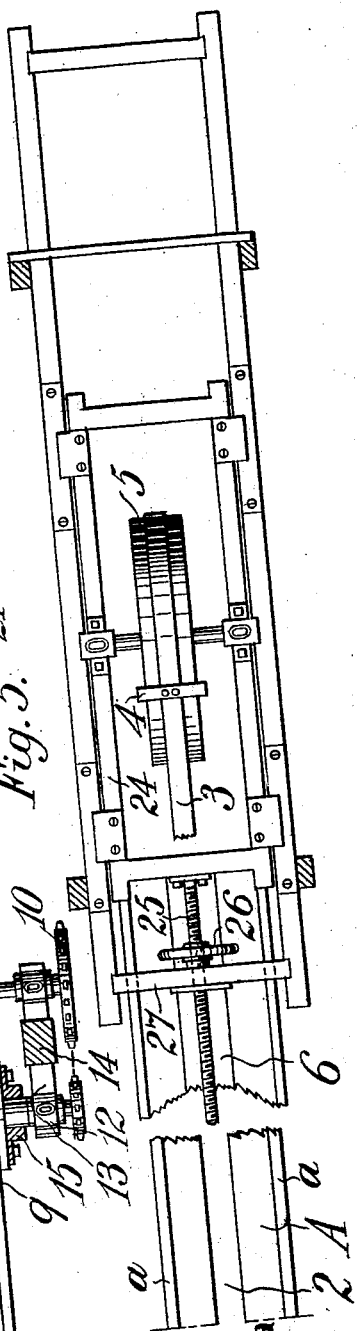
Witnesses,
E. A. Brandau
J. Towse
Inventor,
Charles H. Butler
By Dewey Strong & Co.
Attys

UNITED STATES PATENT OFFICE.

CHARLES H. BUTLER, OF OAKLAND, CALIFORNIA.

TRANSPORTING AND DISTRIBUTING APPARATUS.

SPECIFICATION forming part of Letters Patent No. 715,972, dated December 16, 1902.

Application filed May 1, 1902. Serial No. 105,492. (No model.)

*To all whom it may concern:*

Be it known that I, CHARLES H. BUTLER, a citizen of the United States, residing in Oakland, county of Alameda, State of California, have invented an Improvement in Transporting and Distributing Apparatus; and I hereby declare the following to be a full, clear, and exact description of the same.

My invention relates to an apparatus which is designed for the purpose of transporting goods, such as grain or other products in sacks, from a source of supply, such as a vessel, and distributing them at various points throughout a warehouse or other place of storage.

It consists of the parts and the constructions and combinations of parts, which I will hereinafter describe and claim.

Figure 1 is a longitudinal elevation. Fig. 2 is an enlarged transverse section through the upper horizontal belt-trough. Fig. 3 is a similar view through the lower trough without the belt. Fig. 4 is an enlarged plan of the upper trough and discharge mechanism. Fig. 5 is a continuation of Fig. 4, showing the belt-tightening carriage.

In the handling and storage of wheat and other grain in California the grain is placed in sacks at the point where it is threshed and cleaned, and these sacks are shipped by cars, vessels, and other transporting devices to warehouses, where the sacks are piled up in tiers, reaching as high sometimes as eighteen or twenty feet. The work of handling these sacks has usually been by the use of trucks, transporting the grain to the point where it is to be piled, and then by a crew of men the sacks are piled up to the requisite height.

It is the object of my invention to dispense with the trucks and with all but a few of the men needed for piling the grain. This I effect by the construction of a trough or surface A, extending through the warehouse or other point of deposit at such an elevation as to be substantially above the highest point to which the sacks are to be piled. This trough or surface may extend through the center, if the building be wide, or near one side, or in very wide buildings a plurality of these surfaces may be provided.

As at present shown the surface A has low sides $a$, forming a trough sufficient to keep the sacks in position, and this surface may be shellacked or otherwise made smooth, so as to present little or no obstruction to the easy movement of the sacks. When flour is to be handled in sacks, a sufficient amount of it will filter through the cloth of the sack to make a very smooth and polished surface, which presents but little resistance to the movement of the sacks. Centrally in the floor of this trough or surface is made a slot 2, which extends the whole length of the apparatus.

3 is a narrow belt of any suitable material and construction adapted to travel within the slot or channel 2. The slot may be made about four inches in width and the belt sufficiently wide to travel freely within the slot. To the surface of the belt at suitable intervals are affixed the blocks or cleats 4, which are here shown as being attached by flat-headed bolts passing through the belt and the cleat and having nuts on the upper end which are seated in countersunk openings of the cleat, so as not to tear or injure the sacks. The belt 3 passes around pulleys at each end, as at 5, and any suitable or desired application of power may be made to drive the pulleys and propel the belt with the cleats traveling over the bottom of the trough or surface, so that anything placed upon this surface may be moved along by the cleats and with comparatively little frictional resistance. The return of the belt and its cleats takes place below the pulleys 5, and for the purpose of saving any grain or material which might possibly drop through from broken or perforated sacks I have shown a lower trough or runway, as at 6, having a flat surface of sufficient width to allow the returning cleats to travel upon it and inclined divergent sides, so that anything falling through the slot in the surface above would be caught in this trough, and grain would thus be carried back to a point where it could be discharged and collected. This saves a large quantity of grain, which when the sacks are conveyed in trucks will be spilled about the floor and crushed by the wheels of succeeding trucks. The supply for this transporting device may be derived from any source. I have here shown a construction for supplying it from vessels where the warehouse is located upon a wharf, so that vessels can come up to it. In this case I employ a chute 7, having an endless traveling sprocket-chain, as at 8, the upper end being mounted upon a shaft 9, having sprocket or gear wheels, as at 10, through which power may be transmitted to revolve the carrying-chain. This chain 8 may actuate cleats similar to those shown at 4, and the opposite end of the chute is adapted to rest upon the rail or hatchway of the vessel, so that the sacks of grain, flour, or other material can be placed upon the traveling chain and carried up the inclined chute 7, being delivered over the upper end upon an inclined direction-board, as at 12ª, upon which the sacks slide down upon the floor or surface A, where they are engaged by the cleats 4 of the traveling belt.

In order to support the weight of the upper end of the chute 7 without bearing too heavily upon the pulley-shaft 9, said shaft is journaled in boxes 12, here shown as supported on brackets 13, bolted to the uprights 14 of the framework. The boxes 12 have the hubs so extended that they enter the collars 15, which are fixed upon opposite sides of the upper end of the chute 7, so that these collars have a bearing-surface on the cylindrical hubs of the boxes, and the raising and lowering of the chute causes the collars to turn upon the boxes, while the driving-shaft passing through the boxes is relieved of this weight. The outer end of the chute is suspended by block and tackle or any suitable suspending device, as at 16, and may be raised and lowered to suit the tide or other conditions. The device thus constructed would serve to convey the grain to any desired distance in a direct line, and at the end of this carrier is situated an inclined chute, as at 17, which may serve to receive any sacks carried to that point and discharge them. A very important part of my apparatus, however, is the means for delivering the sacks at any point along the carrier, so that the grain or flour belonging to any party or section may be piled up by itself and all lots in the warehouse can be kept separate. In order to effect this, I have shown openings made at intervals in the sides of the trough, these openings having hinged gates, as at 18, by which they may be closed when that particular discharge is not in use. The bottom of the chute is also partially cut away, as shown at 19, so that this portion being closed by a similarly-shaped piece attached to the gate or otherwise and exposed when the gate is opened. From this point an inclined chute may lead at right or other angle from the opening thus provided. In order to deliver the sacks into said chute, I have shown a device for directing the sacks consisting of a diagonally-placed bar or plate 20. This bar or plate may be made of wood or metal, curved, straight, or angular, the object being by any construction to strike the sack when it arrives at this point and change its direction, so that it will fall out into the inclined exterior chute.

I have found that good results are obtained by employing the diagonally-placed bar 20, having attached to it a second bar 21, which joins it at an acute angle, this bar 21 being firmly fixed to the bar 20, so that the sacks will first strike the bar 21, then the bar 20, thus changing the direction by the action of the two bars, and finally at the discharge end it strikes a third bar 22, which is also fixed to that end of the bar 20 and projects into the opening or gate through which the grain is to discharge.

As shown in the accompanying drawings, the bar 20 stands at an angle of approximately sixty degrees with the line of travel of the sack. The bar 21 is so fixed to it as to stand at an angle of about eighty degrees, while bar 22 stands at about an angle of forty-five degrees. Thus the sacks arriving at any point of discharge where such a direction device is employed will first impinge against the bar 21, having an approximate angle of eighty degrees, and this commences to change the direction of motion of the sack. It then strikes the bar 20, having an angle of approximately sixty degrees, and the direction is still further changed, and finally it strikes the bar 22, having the angle of forty-five degrees, when the direction of motion will be finally changed, so that the sack falling through the opening in the side and bottom of the chute will be received by the inclined chute at that point of delivery. In such cases the sacks are delivered at the point where the pile is to be made, and being constantly delivered on the top of the pile two men are able to do the work formerly needing eight or nine men where the sacks are to be piled up from the floor. The action of the direction-bars is more efficient by reason of the successive changes of direction in straight lines than if the change was attempted to be effected by a regular curve of essentially the same direction. These direction-bars are simply set into the trough or channel wherever the sacks are to be discharged and can be removed and the side gate closed whenever the pile at that point has been completed.

It will be manifest that the sacks can be delivered from either side of the trough by so constructing the delivery-bars that they can be reversed or by having sets of bars for each part where the sacks are to be removed from the trough. By the use of this smooth rigid-bottomed trough and carriers I have found that the amount of power required to transport the sacks for several hundred feet is so small that the loaded apparatus can be moved by hand. The carrier-belt pulley at the outer end of the trough or surface is here shown journaled on a supplemental frame 24, which is guided and slidable in line with the apparatus, and by means a screw 25, fixed to the end of this frame, and a nut with a hand-wheel 26, abutting against a fixed part 27, the frame may be moved and the tension of the belt regulated.

Having thus described my invention, what I claim, and desire to secure by Letters Patent, is—

1. A transporting device for sacks and the like consisting of a smooth-surfaced trough, having a slot extending entirely through its bottom, an endless flexible web belt passing over pulleys and adapted to travel in said slot, cleats fixed transversely upon the belt and extending across the surface upon each side of the slot.

2. An apparatus for transporting sacks and the like consisting of a substantially straight rigid trough or surface having a longitudinal channel made through the bottom, an endless traveling flexible web belt having cleats fixed thereto, said belt traveling in the channel and the cleats extending transversely across the surface of the trough.

3. A device for transporting sacks and the like consisting of a substantially rigid surface or trough having a longitudinal slot or channel opening through its bottom, an endless traveling flexible web belt movable in said channel having cleats extending across the surface, gates by which the side of the trough may be opened and direction-bars adapted to be fixed diagonally across the trough whereby the sacks are delivered through the openings.

4. A transporting apparatus consisting of a rigid substantially straight trough or surface having a longitudinal channel opening through the bottom, an endless traveling belt fitting and movable in said channel having cleats fixed to it and extending transversely across the surface of the trough, gates fixed at intervals in the sides of the trough and openings formed in the bottom of the trough coincident with said gates, direction bars or plates adapted to fit diagonally across the trough whereby the sacks impinging against them are delivered through the side.

5. A transporting and distributing apparatus consisting of a substantially rigid trough or surface having a slot or channel in the bottom, an endless traveling belt fitting and movable in said channel, transverse cleats fixed to the belt extending across the surface of the trough, gates formed in the sides and corresponding cut-away portions in the bottom of the trough, and devices by which a change of direction and discharge of the sacks is effected, said devices consisting of bars united together at acute angles and extending diagonally across the trough.

6. A transporting apparatus consisting of an essentially-rigid smooth-bottomed trough or surface with a longitudinal slot or channel opening through its bottom, an endless traveling flexible web belt movable in said channel, cleats fixed to the belt extending transversely across the bottom, and means for supplying the sacks to the trough consisting of a chute having one end hinged in line with the trough, an endless traveling carrier movable upon the chute boxes in which the driving-shafts of the carrier are journaled and forming a fulcrum about which the chute may be raised or lowered.

7. A transferring apparatus consisting of a substantially rigid smooth trough having a longitudinal slot or channel an endless traveling belt movable in said channel with cleats fixed thereto extending transversely across the bottom of the trough, a supply-chute having its upper end connected with the trough by journal-boxes carried upon fixed supports, collars upon the sides of the chute, said collars resting upon the journal-boxes, a shaft extending through said journal-boxes, an endless traveling belt or carrier, the upper end of which is driven by said shaft, and means for applying power to revolve the shaft.

8. A device for transporting filled sacks and the like, consisting of a smooth continuous trough having an opening through the bottom, a flexible centrally-located endless belt having transverse cleats by which the sacks are advanced movable gates in the sides of the trough, and diagonally-disposed bars whereby the sacks are removed from the cleats and ejected from the side of the trough.

9. A device for transporting full sacks, consisting of a smooth continuous trough, an endless flexible belt with transverse cleats to engage and move the sacks, openings in the sides of the trough, diagonally-disposed bars by which the sacks are delivered through the side openings, and openings through the bottom at one side of the carrying-belt and coincident with side openings, whereby the sacks are tilted and disengaged from the carriers as they are moved toward the discharge.

In witness whereof I have hereunto set my hand.

CHARLES H. BUTLER.

Witnesses:
WILLIAM DUNSTAN,
GEORGE F. HOFFNER.